United States Patent [19]

Maier

[11] Patent Number: 5,711,407
[45] Date of Patent: Jan. 27, 1998

[54] TORSIONAL VIBRATION DAMPER

[75] Inventor: Steffen Maier, Lauf, Germany

[73] Assignee: Luk Lamellen und Kupplungsbau GmbH, Bühl, Germany

[21] Appl. No.: 475,295

[22] Filed: Jun. 7, 1995

[30] Foreign Application Priority Data

Jun. 30, 1994 [DE] Germany .............. 44 22 919.4

[51] Int. Cl.$^6$ ............... F16D 3/12; F16D 3/14; F16D 13/64
[52] U.S. Cl. ............... 192/201; 192/213; 192/213.12; 464/67; 464/68
[58] Field of Search ............... 192/304, 70.17, 192/201, 213, 213.1, 213.11, 213.12, 213.2, 213.21, 213.22; 464/67, 68

[56] References Cited

U.S. PATENT DOCUMENTS

| | | | |
|---|---|---|---|
| 4,101,015 | 7/1978 | Radke | 192/213.22 |
| 4,138,003 | 2/1979 | Malloy | 192/212.1 X |
| 4,518,071 | 5/1985 | Nozawa | 192/212.12 |
| 4,989,710 | 2/1991 | Reik et al. | |
| 5,080,215 | 1/1992 | Forster et al. | 192/213.1 X |
| 5,161,660 | 11/1992 | Huber | |

FOREIGN PATENT DOCUMENTS

| | | |
|---|---|---|
| 34 42 705 A 1 | 5/1986 | Germany . |
| 40 31 762 A 1 | 4/1992 | Germany . |
| 41 41 643 A 1 | 6/1992 | Germany . |

*Primary Examiner*—Richard M. Lorence
*Attorney, Agent, or Firm*—Darby & Darby, PC

[57] ABSTRACT

A composite torsional vibration damper which can be utilized with advantage in the clutch disc of a friction clutch in the power train of a motor vehicle has a composite input member which can be driven by the output element of a combustion engine, an output member which is angularly movable with and relative to the input member about a common axis and can transmit torque to the input element of a variable-speed transmission, and first and second dampers which operate in series to oppose different angular movements of the input and output members relative to each other. The first damper is disposed radially inwardly of the second damper and its rigidity is less than that of the second damper. The energy storing elements of the first damper permit an angular movement of the input and output members relative to each other through an angle of at least 20°, and the second damper permits such angular movement through an angle of at least 15°. The first damper can transmit a maximum torque of between about 4 N-m and 20 N-m, and the second damper has a torsional spring rate in the range of between about 5 and 40 N-m/°.

58 Claims, 4 Drawing Sheets

TORSIONAL VIBRATION DAMPER

BACKGROUND OF THE INVENTION

The invention relates to torsional vibration dampers in general, and more particularly to improvements in composite torsional vibration dampers which can be utilized with advantage in friction clutches between the prime movers and the variable-speed transmissions of motor vehicles. Still more particularly, the invention relates to composite torsional vibration dampers which can be installed in the clutch plates (also called clutch discs) between the pressure plates and the counterpressure plates of friction clutches for use in the power trains between the output elements of combustion engines and input elements of one or more driven units (e.g., variable-speed transmissions) of motor vehicles.

It is already known to provide a friction clutch with a clutch plate or clutch disc (hereinafter called clutch disc) which employs an input member (such input member can receive torque from the counterpressure plate when the clutch is engaged), an output member (e.g., a hub which can drive the input element of a variable speed transmission), and two dampers which are installed between the input and output members to operate in series. It is also known to construct the dampers in such a way that one of the dampers employs energy storing elements having a first rigidity and that the other damper employs energy storing elements having a second rigidity exceeding the first rigidity. Torsional vibration dampers of the above outlined character are disclosed, for example, in published German patent applications Ser. Nos. 41 41 643 and 40 36 762. A further clutch disc with two dampers is disclosed in the commonly owned U.S. Pat. No. 5,161,660 granted Nov. 10, 1992 to Lothar Huber for "Clutch plate with plural dampers". The disclosures of all patents and patent applications referred to in this specification are incorporated herein by reference.

The torsional vibration dampers which are disclosed in the aforementioned published German patent applications utilize a so-called idling damper and a so-called main damper or load system. The idling damper can be bypassed by resorting to suitable abutments when the magnitude of transmitted torque reaches a predetermined value so that, if the input and output members of the composite torsional vibration damper continue to turn relative to each other, such angular movement is opposed exclusively by the main damper. The bypass torque (i.e., the maximum transmissible torque) of the idling damper is selected essentially to furnish a satisfactory damping action for fluctuations of torques which develop primarily or exclusively while the engine of the motor vehicle utilizing such a clutch disc is idling. As used herein, the term idling is intended to denote when the friction clutch embodying the clutch disc and being installed between a combustion engine and a variable-speed transmission is engaged but the transmission is maintained in a neutral position, i.e., the transmission is not set to rotate the wheels forwardly or in reverse. Otherwise stated, the transmission cannot transmit any torque between one or more wheels and the engine of the motor vehicle. Such clutch discs have been found to be highly satisfactory in a variety of motor vehicles. However, they cannot satisfactorily prevent or at least adequately reduce the level of several types of noise and/or vibration under certain operating conditions.

OBJECTS OF THE INVENTION

An object of the invention is to provide a composite torsional vibration damper which is more versatile than heretofore known dampers.

Another object of the invention is to provide a composite torsional vibration damper which embodies all desirable features but does not exhibit the drawbacks of conventional dampers.

A further object of the invention is to provide a composite torsional vibration damper whose versatility can be enhanced by carrying out certain minor modifications in the basic design.

An additional object of the invention is to provide a novel and improved combination of discrete dampers for use in the above outlined composite torsional vibration damper.

Still another object of the invention is to provide a composite torsional vibration damper which exhibits the above outlined features and advantages but the cost of which does not or need not exceed the cost of heretofore known torsional vibration dampers.

A further object of the invention is to provide a novel and improved clutch plate or clutch disc which embodies the above outlined composite torsional vibration damper.

Another object of the invention is to provide a novel and improved method of assembling the above outlined composite torsional vibration damper.

An additional object of the invention is to provide a friction clutch and a power train which embody the above outlined composite torsional vibration damper.

Still another object of the invention is to provide a novel and improved array of energy storing elements for use in at least one damper of the above outlined composite torsional vibration damper.

SUMMARY OF THE INVENTION

The invention is embodied in a composite torsional vibration damper, particularly for use in clutch plates or clutch discs of friction clutches in motor vehicles. The improved composite torsional vibration damper comprises input and output members which are angularly movable relative to each other about a common axis, and first and second dampers installed in series between the input and output members. The first damper has a first rigidity or stiffness and the second damper has a second rigidity or stiffness greater than the first rigidity. The first damper comprises energy storing elements which are operative to permit an angular movement of the input and output members relative to each other through a first angle of at least 20° and to generate a maximum torque of between about 4 N-m and 20 N-m, and the second damper is operative to permit an angular movement of the input and output members relative to each other through a second angle of at least 15°. The second damper has a torsional spring rate in the range of between about 5 and 40 N-m/°.

The arrangement is preferably or can be such that the maximum torque which can be generated by the first damper is between about 6 N-m and 16 N-m. Furthermore, the aforementioned torsional spring rate of the second damper can be between about 10 and 25 N-m/°.

The torsional spring rate of the first damper can be between about 0.3 and 1.5 N-m/°.

At least one of the input and output members is angularly movable relative to the other of the first and second members from a neutral position in a first direction through a first angle and in a second direction, counter to the first direction, through a second angle which can be identical with but can also be different from the first angle.

The input and output members and the first and second dampers of the improved composite torsional vibration damper can be installed in a clutch disc of a friction clutch in a motor vehicle which is operative to pull a load or to coast. The input and output members of such composite torsional vibration damper are or can be angularly movable relative to each other through a first angle when the vehicle is pulling a load and through a second angle, which is or which can be smaller than the first angle, when the vehicle is coasting.

Furthermore, and if the input and output members and the first and second dampers of the composite torsional vibration damper are installed in a clutch disc or clutch plate of a friction clutch in a motor vehicle which is operative to pull a load or to coast, the arrangement can be such that the input and output members are angularly movable relative to each other against the opposition of the first damper through a first angle when the vehicle is pulling a load and through a second angle, smaller than the first angle, when the vehicle is coasting. The first angle can be between 1.5 and 3 times the second angle.

The first damper is preferably designed in such a way that it has a single-stage characteristic curve. The same holds true for the second damper. In other words, at least one of the first and second dampers can be designed to have a single-stage characteristic curve.

The output member of the composite torsional vibration damper can include a hub having an internal profile (e.g., a set of axially parallel splines alternating with axially parallel grooves) which is non-rotatably engageable with a rotary driven element (e.g., with the input shaft of a variable-speed transmission). The first damper of such composite damper can further comprise an output element which is non-rotatably mounted on the output member, and the second damper of such composite torsional vibration damper can comprise an output element having an internal profile mounted on an external profile of the output member with limited freedom of angular movement between the output member and the output element of the second damper. The input member of such torsional vibration damper can include two substantially disc-shaped components spaced apart from each other in the direction of the common axis of the input and output members and flanking the output element of the second damper.

The first damper can be disposed between the output element of the second damper and one of the components, as seen in the direction of the common axis of the input and output members. The first damper can further comprise at least one substantially disc-shaped input element which is non-rotatably connected with the output element of the second damper, and the at least one input element of the first damper can be provided with receptacles for the energy storing elements of the first damper.

The first damper can further comprise a substantially ring-shaped output element which is non-rotatably connected to the output member and is disposed between a substantially disc-shaped output element of the first damper and a substantially flange-like element of the second damper, as seen in the direction of the common axis.

The energy storing elements of the first damper can define a first annulus having a first diameter, and the second damper can comprise energy storing elements which form a second annulus having a second diameter larger than the first diameter.

At least the energy storing elements of the first damper can constitute coil springs which can be precurved or bent or bowed in advance so that they together form the aforementioned first annulus. Such precurving is observable at least when the energy storing elements of the first damper are not stressed as a result of angular movement of the input and output members relative to each other. The median radius of the annulus which is formed by the arcuate coil springs constituting the energy storing elements of the first damper can at least approximate the median radii of curvature of such coil springs, at least when the coil springs are not stressed.

At least the first damper can further comprise a friction control device. Such friction control device can constitute or include an entrainment friction washer. The difference between the maximum value of the first angle (namely the angle through which the first damper permits the input and output members to move relative to each other) and a free angle of the entrainment friction washer is or can be between about 10° and 35°.

The energy storing elements of the first damper can be constructed, installed and arranged to generate a frictional damping action which varies as a function of changes of the angle through which the first damper permits the input and output members to turn relative to each other.

The input and output members are normally rotatable at a plurality of different speeds and the energy storing elements of the first damper can be constructed, installed and arranged to generate a frictional damping action which varies as a function of changes of the speed of the input and output members.

As mentioned above, the output member of the improved composite damper can include or constitute a hub having an external profile (e.g., a set of external teeth), and the input member can include at least one substantially disc-shaped component or carrier. The aforementioned entrainment friction washer can be disposed between the external profile of the hub and the at least one substantially disc-shaped component, as seen in the direction of the common axis of the input and output members. When properly installed, the friction washer is in friction generating contact with the at least one substantially disc-shaped component. In accordance with a presently preferred embodiment, the friction washer can include at least one protuberance which mates with the external profile of the hub in such a way that it permits limited angular movements of the friction washer and the hub relative to each other about the common axis of the input and output members. The external profile of the hub can include teeth which extend at least substantially in the direction of the aforementioned common axis, and the at least one protuberance of the friction washer then also extends at least substantially in the direction of such common axis. The friction washer can be provided with a substantially frustoconical surface which serves to center the at least one substantially disc-shaped component relative to the hub. The composite damper can further comprise means for biasing the friction washer against the at least one substantially disc-shaped component; such biasing means can comprise a diaphragm spring which reacts against the input element of the first damper and bears upon the friction washer.

The novel features which are considered as characteristic of the invention are set forth in particular in the appended claims. The improved composite torsional vibration damper itself, however, both as to its construction and the mode of utilizing the same, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
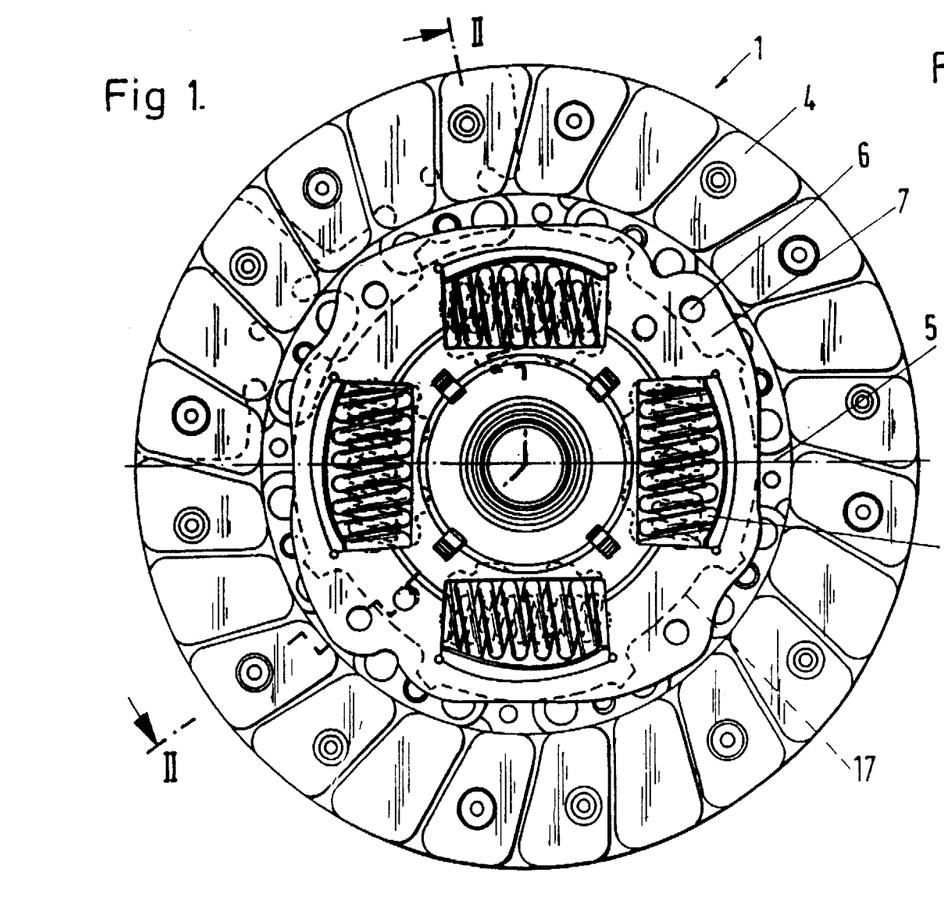
FIG. 1 is an elevational view of a clutch plate or clutch disc utilizing a composite torsional vibration damper which embodies one form of the present invention.
Figure 2:
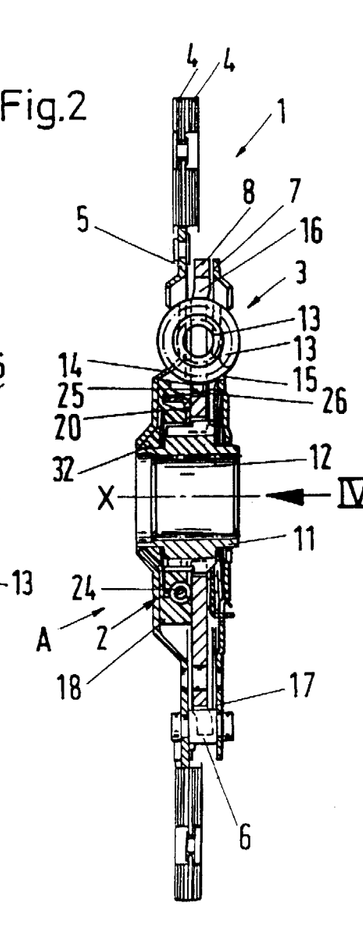
FIG. 2 is a sectional view substantially as seen in the direction of arrows from the irregular line II—II in FIG. 1.

Referring first to FIGS. 1 and 2, there is shown a clutch disc or clutch plate 1 which can be utilized between the pressure plate and the counterpressure plate of a friction clutch in the power train between the output element of the combustion engine and one or more wheels of a motor vehicle. Reference may be had, for example, to commonly owned U.S. Pat. No. 4,989,710 granted Feb. 5, 1991 to Wolfgang Reik et al. for "Torque transmitting and torsion damping apparatus for use in motor vehicles".

Figure 3:
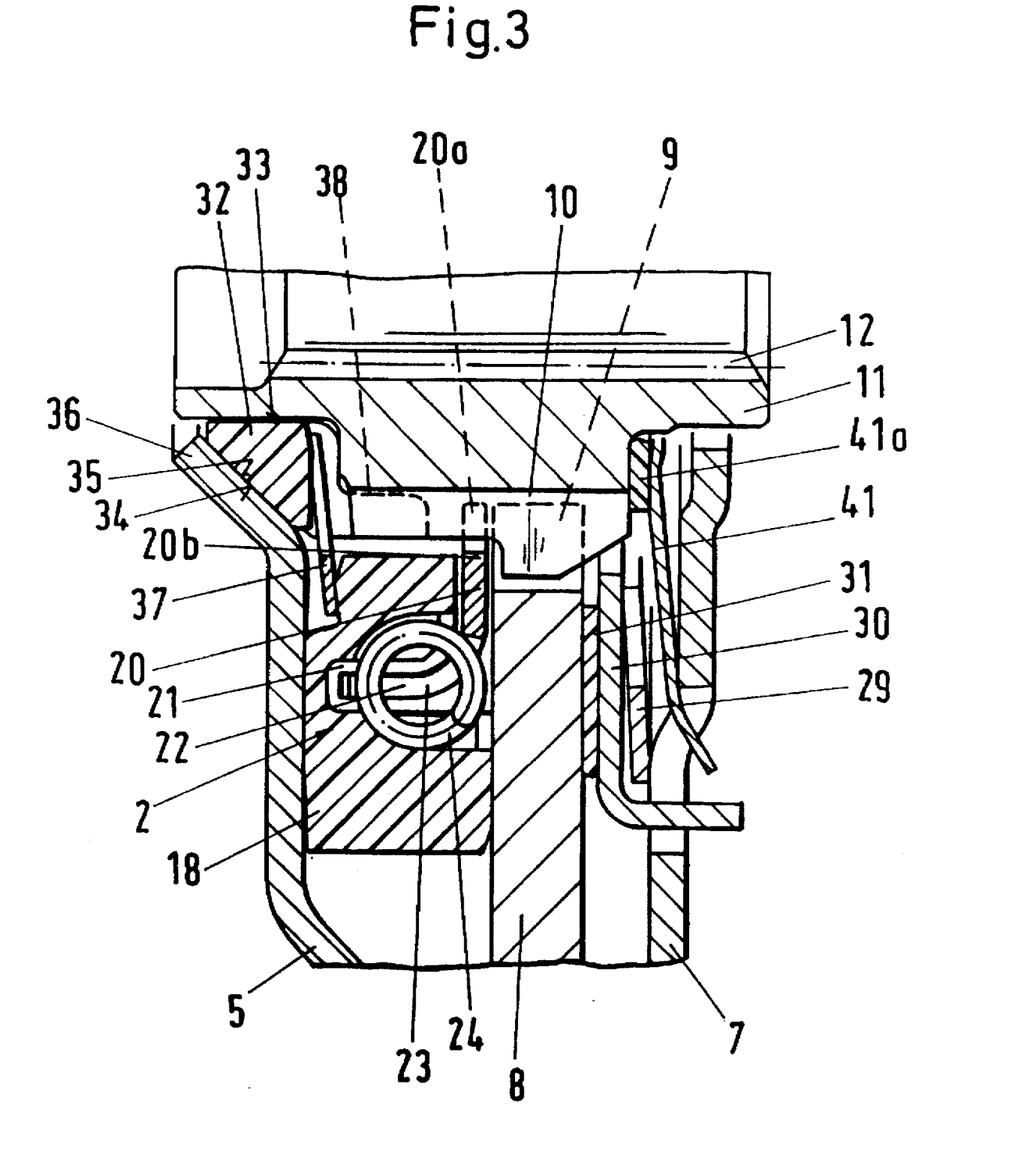
FIG. 3 is an enlarged view of a detailed which is pointed out by the arrow "A" shown in FIG. 2.

The clutch disc 1 comprises a first damper 2 and a second or main damper 3. The input member of the clutch disc 1 includes two axially spaced apart substantially disc-shaped components 5 and 7 which are non-rotatably affixed to one another in axially spaced-apart positions by a set of distancing elements 6, e.g., in the form of rivets. At the same time, the components 5, 7 constitute the input element of the second damper 3. The component 5 carries two sets of friction linings 4 which are clamped between the pressure plate and the counterpressure plate of the friction clutch when the latter is engaged, i.e., when the input member 5, 7 is called upon to transmit torque to the input shaft of the variable-speed transmission in the aforementioned power train, such as the friction clutch disclosed in the commonly owned U.S. Pat. No. 4,989,710. The output element of the second damper 3 includes a flange 8 which, as can be best seen in FIG. 3, is provided with an internal profile 9 (such as an annulus of axially parallel internal teeth) mating, with a certain amount of play, with an external profile 10 (e.g., a spur gear) of a hub 11 forming part of or constituting the output member of the clutch disc 1.

The common axis of the input member 5, 7 and the output member 11 of the clutch disc 1 is shown in FIG. 2, as at X. The amount of play between the external profile 10 and the internal profile 9 (as seen in the circumferential direction of the clutch disc 1, corresponds to the operating range of the first damper 2. The hub 11 is further provided with an internal profile 12 (e.g., a set of axially parallel splines) which renders it possible to slip the hub onto the input shaft of the variable-speed transmission in such a way that the hub and the input shaft cannot turn relative to each other.

The second damper 3 comprises energy storing elements 13 in the form of coil springs which together form an annulus having its center on the common axis X of the input member 5, 7 and output member 11. The components 5, 7 and the flange 8 are respectively provided with discrete windows 14, 15 and 16 for portions of each of the coil springs 13. When properly installed, the coil springs 3 oppose angular movements of the input member 5, 7 and the output member 11 relative to each other. The extent of angular movability of the input and output members of the clutch disc 1 relative to each other is limited by the circumferential length of elongated arcuate cutouts 17 in the radially outer marginal portion of the flange 8 for the shanks of the distancing elements 6. It is clear that the illustrated cutouts 17 can be replaced by arcuate slots in the flange 8 or that the extent of angular movability of the input and output members 5, 7 and 11 relative to each other can be limited in any other suitable way.

The first damper 2 is installed between the disc-shaped component 5 and the flange 8, as seen in the direction of the axis X. The input member of the first damper 2 is a substantially washer like plastic part 18 (hereinafter called ring for short) which is non-rotatably affixed to the fange 8. A substantially disc-shaped part or flange 20 between the ring 18 and the flange 8 constitutes or forms part of the output element of the first damper 2 and is non-rotatably connected with the hub (output member) 11. The ring 18 and the output element 20 can turn relative to each other about the axis X to an extent corresponding to angular play between the external profile 10 of the hub 11 and the internal profile 9 of the flange 8. Such angular movements of the ring 18 and output element 20 relative to each other must take place against the opposition of an annulus of energy storing elements 24 in the form of coil springs which form part of the first damper 2. The coil springs 24 are received in part in recesses or windows 21 of the ring 18 and in windows 22 of the output element 20. The radially inner marginal portion of the output element 20 forming part of the first damper 2 is provided with a toothed profile 20a which mates without play, or with negligible play, with a smaller-diameter portion of the external profile 10 on the hub 11.

Figure 4:
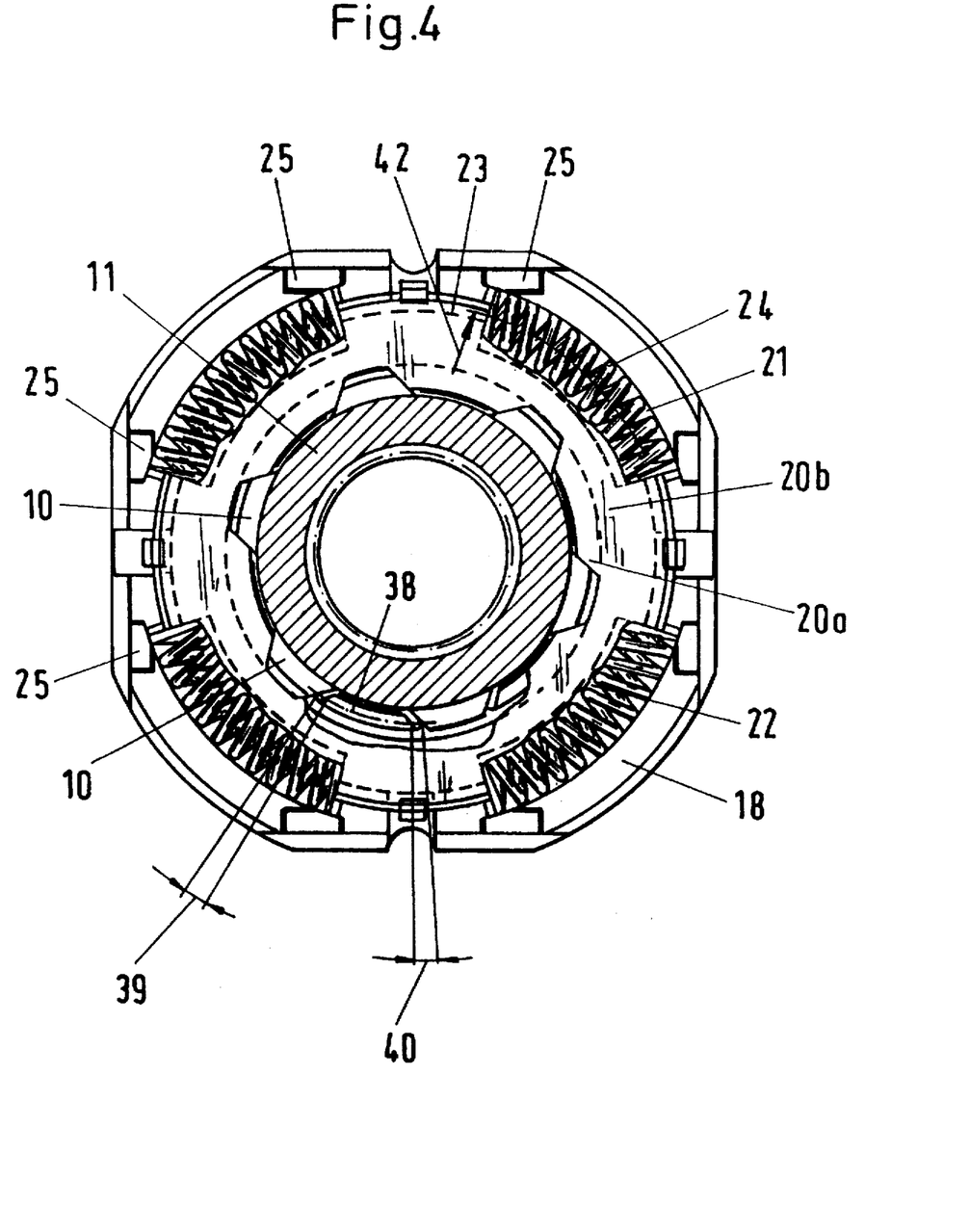
FIG. 4 is an enlarged view of the first damper substantially as seen in the direction of the arrow IV in FIG. 2.

The ring 18 of the first damper 2 and the flange (output element) 8 of the second damper 3 are non-rotatably coupled to each other by a form-locking socket-and-plug connection. As best shown in FIGS. 2 and 4, the ring 18 is provided with a set of circumferentially spaced apart axially parallel projections or lugs 25 which project into complementary recesses or cutouts 26 of the output element or flange 8. In the illustrated embodiment, the recesses 26 communicate with the adjacent windows 16 provided in the flange 8 for the coil springs 13 of the second damper 3. FIG. 4 also shows that the recesses 21 of the ring 18 have an arcuate shape and confine or receive the major portions of the respective coil springs 24. To this end, and as can be seen in FIG. 3, the recesses 21 extend inwardly from that end face of the ring 18 which confronts the flange 8 and their depth, as considered in the direction of the axis X, is sufficient to ensure that at least a major portion of each coil spring 24 can be received therein. The end convolutions of the coil springs 24 can but need not abut the adjacent surfaces at the ends of the respective arcuate recesses or receptacles 21.

The output element 20 of the first damper 2 can be made of sheet metal and comprises a radially extending circumferentially complete portion 20b which surrounds the hub 11. The radially outer marginal zone of the portion 20b is provided with arms 23 (see particularly FIG. 3) which extend in parallelism with the axis X and are distributed (as seen in the circumferential direction of the ring 18) in such a way that they can engage the adjacent end convolutions of the coil springs 24 at least when the ring 18 and the output element 20 are caused to turn relative to each other about the axis X. Such engagement causes the coil springs 24 to store energy or to store additional energy. As can also be seen in FIG. 3, the arms 23 extend diametrically across the major portions of or all the way across the entire end convolutions of the coil springs 24 to thus ensure highly predictable stressing of the springs 24 in response to angular displacements of the ring 18 and the output element 20 relative to each other.

A resilient element 29, such as a diaphragm spring (see FIG. 3), is provided to maintain the ring 18 in a desired axial position relative to the component 5. The diaphragm spring 29 is installed between the component 7 and the flange 8. The radially outer portion of the diaphragm spring 29 reacts against the component 7 and its radially inner portion bears against a pressure transmitting disc 30 which, in turn, urges a friction ring or washer 31 against the adjacent side of the flange 8. It will be seen that the diaphragm spring 29 urges the parts 30, 31, 8 and 18 in a direction to the left, as viewed in FIG. 3, so that the left-hand side of the ring 18 is urged toward the inner side of the component 5. The diaphragm spring 29 is installed in stressed condition and performs the additional function of pulling the component 5 axially in a direction toward the flange 8.

The plastic material of the ring 18 can be reinforced by filaments and/or in any other suitable way. This ring is or can be in direct frictional engagement with the component 5 and thus cooperates with the latter to perform a desirable frictional damping action as part of the second damper 3. When the components 5, 7 and the flange 8 are caused to turn relative to each other, the friction ring 31 also performs a desirable damping action, again as a part of the second damper 3.

The second damper 3 can further comprise a so-called friction control plate 32, e.g., a so-called entrainment friction washer. The washer 32 can cooperate with the coil springs 13 of the second damper 3 in such a way that the restoring force of the springs 13 suffices to return the washer at least close to a starting angular position with reference to the components 5, 7 and flange 8. As can be best seen in FIG. 3, the friction washer 32 is adjacent a frustoconical radially inner portion 36 of the component 5 and is biased against the adjacent frictoconical surface 35 of the portion 36 by a diaphragm spring 37 which reacts against the adjacent radially inner portion of the ring 18. The external profile 10 of the hub 11 ends short of the left-hand axial end of the hub, as viewed in FIG. 3, to thus establish room for the diaphragm spring 37 and the friction washer 32 between the profile 10 and the radially inner portion 36 of the component 5, as seen in the direction of the axis X. The internal surface of the friction washer 32 surrounds a cylindrical peripheral surface 33 of the hub 11 and its frustoconical surface 34 abuts the complementary frustoconical surface 35 of the portion 36 of the component 5. The frustoconical surfaces 34 and 35 cooperate to center the components 5, 7 (i.e., the input member of the clutch disc 1) on the hub 11.

As can be seen in FIG. 3, the friction washer 32 has a substantially wedge-shaped cross-sectional outline with a radially extending side engaged by the diaphragm spring 37, with a cylindrical internal surface surrounding the peripheral surface 33 of the hub 11, and with the frustoconical surface 34 abutting the complementary frustoconical surface 35 of the radially inner portion 36 of the component 5. The bias of the diaphragm spring 37 relative to the bias of the diaphragm spring 29 is selected in such a way that the bias of the spring 29 prevails; this ensures that the friction washer 24 remains in uninterrupted frictional engagement with the surface 35 of the frustoconical portion 36 of the disc-shaped component 5.

The friction washer 32 is provided with axially parallel protuberances 38 in the form of noses or teeth which mate with the teeth forming part of the external profile 10 of the hub 11. As can be seen in FIG. 4, the dimensions of the protuberances 38 (as measured in the circumferential direction of the hub 11) are selected in such a way that the friction washer is mounted on the hub with a preselected angular play 39+40. FIG. 4 further shows that the width of the protuberances or teeth 38 (as measured in the circumferential direction of the hub 11) is less than the corresponding dimensions of the internal teeth 20a of the output element 20 of the first damper 2. There is no play or no appreciable play between the internal teeth 20a and the external profile 10 of the hub 11.

A further diaphragm spring 41 is installed in the clutch disc 1 at the right-hand side of the external profile 10 on the hub 11, as viewed in FIG. 3. This spring is installed in stressed condition so that it reacts against the inner side of the component 7 and serves as a means for biasing a friction ring 41a against the adjacent radially outwardly extending shoulder of the external profile 10. FIG. 3 further shows that the radially outer portion of the diaphragm spring 41 is non-rotatably coupled to the component 7. The friction ring 41a constitutes a desirable but optional feature of the improved clutch disc 1. The purpose of the diaphragm spring 41 and the friction ring 41a is to ensure that the input member 5, 7 is maintained in a fixed axial position relative to the output member (hub) 11. The bias of the stressed diaphragm spring 41 ensures that the component 5 is pulled in the direction of the axis X toward the external profile 10 of the hub 11 which ensures that the friction washer 32 is clamped between the portion 36 of the component 5 and the adjacent radially extending end face of the profile 10.

Referring again to FIG. 4, it will be seen that the arcuate coil springs 24 of the first damper 2 are relatively long, as seen in the circumferential direction of the ring 18, and that the diameters of the convolutions of these springs are relatively small. As already mentioned hereinbefore, the coil springs 24 can be precurved, i.e., they can be imparted an arcuate shape prior to insertion into the recesses 21 of the ring 18. This simplifies the insertion of such springs into their respective recesses 21. The desired precurving or advance bending of the springs 24 can be carried out in the manufacturing plant, i.e., at the time of making the springs. It is presently preferred to impart to the springs 24 (at the spring manufacturing plant) a configuration such that the median radii of curvature of the precurved springs at least approximate the median radius 42 (FIG. 4) of the annulus defined jointly by the four (preferably identical) springs of the first damper 2.

The springs 24 can be received in their recesses 21 in such a way that they are not stressed at all or that they are subjected to relatively small stresses in a neutral or starting angular position of the input member 5, 7 relative to the output member 11. For example, the relatively small stresses in the neutral positions of the input and output members of the clutch disc 1 relative to each other might be attributable to manufacturing tolerances. However, it is equally within the purview of the invention to intentionally establish a certain amount of play as seen in the circumferential direction of the ring 18, e.g., in the range of between 0° and about 2°.

The diameter of the annulus of coil springs 24 forming part of the first damper is smaller than the diameter of the annulus of coil springs 13 forming part of the second damper 3 (see particularly FIG. 2). The rigidity or stiffness of the coil springs 24 is less than that of the coil springs 13.

The convolutions of the coil springs 24 forming part of the first damper 2 abut or can abut the surfaces bounding the recesses 21 in the ring 18. Consequently, when the coil springs 24 are caused to store energy or to store additional energy, this results in the development of friction between the convolutions of the springs 24 and the surfaces bounding the respective recesses 21. Such frictional damping action increases in response to progressing compression of the springs 24. The reason is that, as the compression of the springs 24 progresses, the magnitude of radial forces exerted by the springs 24 upon the adjacent surfaces bounding the respective recesses 21 also increases because the springs 24 exhibit the tendency to bend or bulge radially outwardly all the way between their end convolutions. In addition, such tendency of the coil springs 24 to bulge radially outwardly increases in response to increasing rotational speed of the ring 18 because the springs 24 are being acted upon by centrifugal force. This outward bulging of the coil springs 24 under the action of centrifugal force results in at least some, e.g., very slight, increase of frictional engagement between the convolutions of such springs and the radially outwardly adjacent portion of surfaces bounding the respective recesses 21.

The aforementioned friction control member or friction washer 32 is desirable and advantageous under many circumstances (i.e., in connection with numerous uses of the improved clutch disc 1) because, once the input member 5, 7 and the output member (hub) 11 have completed a certain angular movement relative to each other, the friction washer furnishes an additional frictional damping action and is operatively connected with at least one energy storing element (such as one of the springs 24) by way of suitable abutments so that such at least one energy storing element tends to return the friction washer all the way or at least close to its starting or initial position when the stressing of the clutch disc 1 in a direction to move its input and output members angularly and relative to each other is interrupted or terminated.

The coil springs 13 which serve to oppose angular movements of the input element 5, 7 and the output element or flange 8 of the second damper 3 relative to each other are or can be installed in the respective windows 14, 15 and 16 without any or with negligible axial stressing. The length of the windows 14, 15 and 16 (as seen in the circumferential direction of the flange 8) is or can be the same. The coil springs 13 can be installed with a certain amount of initial stressing which is selected in advance, i.e., which does not develop in an unpredictable fashion. As a rule, the coil springs 13 (which are first to become active in response to angular movement of the input member 5, 7 and the output member (hub) 11 relative to each other) are installed between the input and output members 5, 7 and 8 of the second damper in their respective windows 14, 15, 16 without any tolerances or with tolerances which are close to zero. At the very most, the coil springs 13 can be installed in only slightly stressed condition. This ensures that the coil springs 13 are not loosely nested in their respective sets of windows 14, 15, 16 which could result in the generation of highly undesirable rattling and similar noise. If the coil springs 13 which, as already stated above, are first to become stressed in response to angular movement of the input member 5, 7 and the output member (hub) 11 of the clutch disc 1 relative to each other, are installed in their respective sets of windows 14, 15, 16 with an initial stress, the initial stress can be selected in such a way that the moment of resistance which is generated as a result of the establishment of such initial stress exceeds the maximum torque adapted to be generated by the first damper 2, i.e., by the coil springs 24. Such maximum torque is furnished by the first damper 2 (i.e., by the coil springs 24) when the elements of the internal profile 9 of the flange 8 abut the elements of the external profile 10 of the hub 11. However, it is often preferred to construct and assemble the clutch disc 1 in such a way that the initial moment of resistance which is generated by the coil springs 13 of the second damper 3 (i.e., by the coil springs which are stressed first in response to angular movement of the input member 5, 7 and the output member 11 relative to each other) is less than the maximum torque (final torque) which can be transmitted by the first damper 2, i.e., by the coil springs 24. Such design of the clutch disc 1 ensures that, at least within a portion of the maximum possible angular movement of the input member 5, 7 and the output member 11 relative to each other, the coil springs 24 are stressed simultaneously with at least those coil springs 13 which constitute the first stage of the second damper 3. Thus, the coil springs 24 and at least some of the coil springs 13 then operate in series and are jointly compressed to store additional amounts of energy; such operation in series lasts until the angular movement of the flange 8 relative to the hub 11 is terminated by the cooperating profiles 9 and 10 of the flange 8 and the hub 11, respectively.

The first damper 2 is preferably designed, or can be designed, in such a way that it permits a maximum angular movement or 20° between the flange (output element) 8 of the second damper 3 and the hub 11 which is or which forms part of the output member of the clutch disc 1. In the embodiment which is shown in FIGS. 1 to 4, such maximum angular movement is determined by the play between the profiles 9 and 10 (as seen in the circumferential direction of the flange 8 and hub 11). The maximum torque (or final torque) which can be generated or transmitted by the coil springs 24 of the first damper 2 is preferably within the range of 4 N-m and 20 N-m. Such maximum torque is being transmitted by the first damper 2 when the profiles 9 and 10 can no longer turn relative to each other. It is presently preferred to select such maximum torque to be between about 6 N-m and 16 N-m.

The second damper 3 is preferably designed in such a way that it permits the components 5, 7 and the flange 8 to turn relative to each other through an angle of not less than 20°. The torsional spring rate which can be generated by the coil springs 13 of the second damper 3 is preferably between about 5 and 40 N-m/°, most preferably between about 10 and 25 N-m/°. The torsional spring rate adapted to be generated by the coil springs 24 of the first damper 2 is preferably between 0.3 and 1.5 N-m/°.

Figure 5:
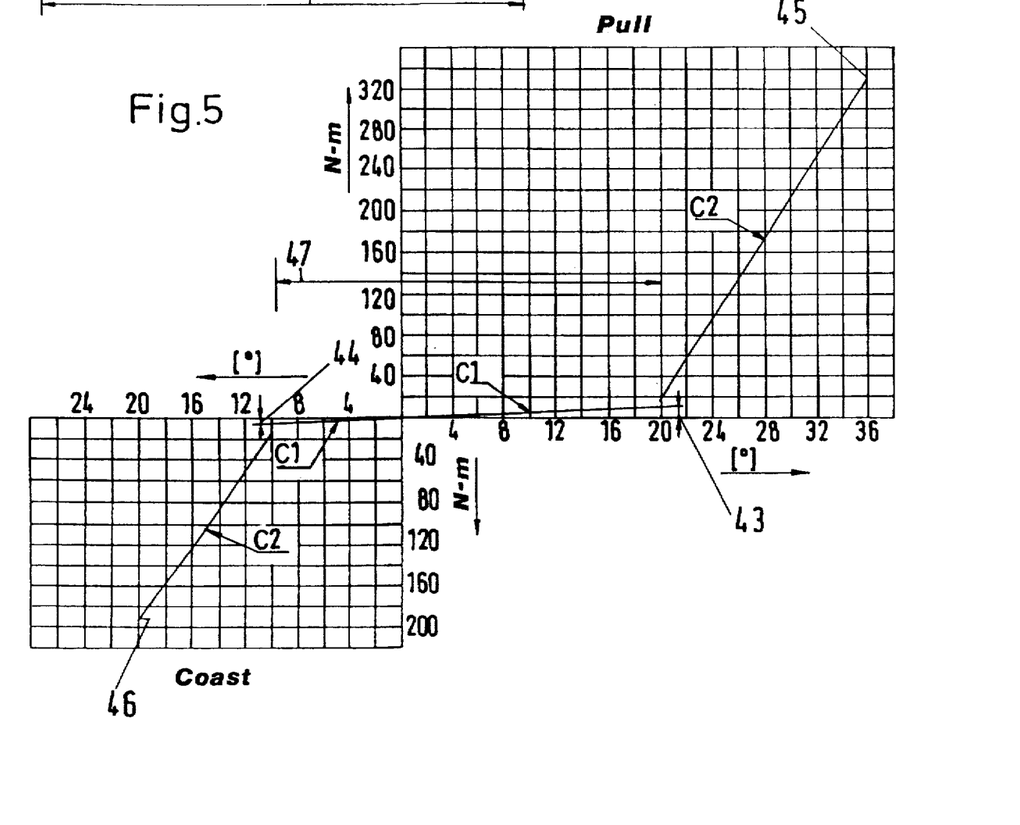
FIG. 5 is a diagram showing one presently preferred characteristic torsion curve of the clutch disc which is illustrated in FIGS. 1 to 4.

The diagram of FIG. 5 shows the characteristic curve of the clutch disc 1. Each of the two dampers of the illustrated composite torsional vibration damper is a single-stage or one-stage damper. However, it is within the purview of the invention to employ a multi-stage first damper (replacing the one-stage damper 2) and/or a multi-stage second damper (replacing the one-stage damper 3).

When the angular positions of the input member 5, 7 and the output member 11 relative to each other change (i.e., when such input and output members leave their neutral or starting positions), the first damper 2 is assumed to permit the input and output members 5,7 and 11 of the clutch disc 1 to turn relative to each other through an angle of up to about 20° while the vehicle utilizing a friction clutch which embodies the clutch disc 1 is pulling a load, and to permit the input and output members of the clutch disc to turn relative to each other through an angle of up to about 10° while the vehicle is coasting. It is further assumed that the second damper 3 permits the input and output members to turn relative to each other through an angle of up to 10° while the vehicle is coasting and through an angle of about 16° while the vehicle is pulling a load.

An inspection of the characteristic curve which is shown in FIG. 5 reveals that the maximum torque 43 which can be transmitted by the first damper 2 while the vehicle is in the process of pulling a load is about 11 N-m, and that the maximum torque 44 adapted to be transmitted by the coil springs 24 while the motor vehicle is coasting is about 6 N-m. This amounts to a torsional spring rate C1 of about 0.57 N-m/°; such rate applies for that range of angular movement of the input and output members which is opposed by the first damper 2, i.e., the torsional spring rate c1 is generated by the coil springs 24.

The coil springs 13 of the second damper are assumed to have been installed with a certain initial stress. As shown in the diagram of FIG. 5, such initial stress causes the generation of an initial torque which is somewhat larger than the maximum torque transmittable by the coil springs 24 of the first damper 2. This results in the development of a relatively small vertical jump during transition from the torsional spring rate c1 to the torsional spring rate c2 which latter is generated by the coil springs 13.

The jump between the torsional spring rates c1 and c2 can be reduced or eliminated by reducing the initial stressing of the coil springs 13. In other words, by properly selecting the initial stressing of the coil springs 13, one can eliminate any noticeable transition from absorption of torsional vibrations by the first damper 2 to absorption of torsional vibrations by the second damper 3. The maximum torque 45 transmittable by the second damper 3 while the vehicle is in the process of pulling a load is approximately 330 N-m, and the maximum torque 46 which the damper 3 can transmit while the vehicle is coasting is in the range of 190 N-m. When such maximum torques are reached, each distancing element 6 between the components 5, 7 reaches the one or the other end of the respective cutout 17 in the flange 8, depending upon whether the vehicle is in the process of pulling a load or is coasting. Based on the characteristic curve which is shown in FIG. 5, the torsional spring rate c2 adapted to be generated by the coil springs 13 of the second damper 3 is in the range of 19.5 N-m/°.

FIG. 5 further shows that the maximum possible relative angular displacement of the input member 5, 7 and the output member 11 forming part of the clutch disc 1 having a characteristic curve of the type shown in FIG. 5 is very large for such types of composite dampers, namely in the range of 56°. Thus, the improved clutch disc 1 renders it possible to establish very large angular displacements of the input and output members relative to each other and to transmit very large maximum torques while, at the same time, operating with relatively small torsional spring rates.

The damping action of the aforediscussed friction generating devices in the clutch disc 1 of FIGS. 1 to 4 was not considered in plotting the characteristic curve which is shown in FIG. 5. The frictional damping action or frictional hysteresis which is generated by the several friction generating devices is superimposed upon the characteristic curve of FIG. 5.

Figure 6:
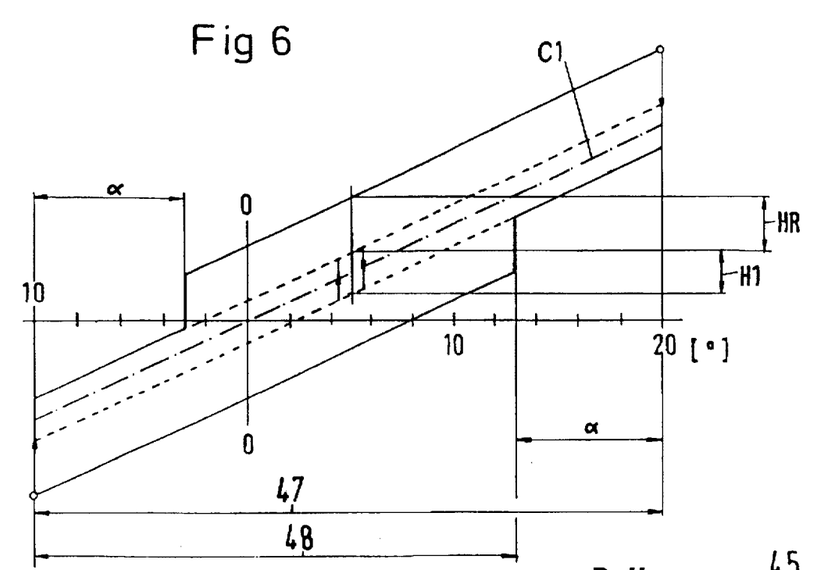
FIG. 6 is an enlarged view of a portion of the characteristic curve shown in FIG. 5.

FIG. 6 shows, drawn to a larger scale, the mode of operation and the effect of the friction washer 32 for the angular displacement range of the first damper 2. FIG. 6 further shows the basic hysteresis H1 which is generated as a result of axial prestressing of the diaphragm spring 41. The basic hysteresis H1 develops primarily as a result of frictional engagement of the washer 32 and ring 41a with the hub 11. A frictional damping action HR or a frictional hysteresis 2× HR is superimposed upon the basic hysteresis H1, and such damping action HR is generated as a result of frictional engagement between the washer 32 and the substantially disc-shaped component 5 of the input member 5, 7 of the clutch disc 1. As can be seen, the frictional damping action which is generated by the washer 32 is delayed through an angle alpha which, in FIG. 6, is shown as amounting to approximately 7°. The magnitude of the angle alpha is determined by the combined play or clearance 39+40 between the protuberances 38 of the washer 32 and those portions of the external profile 10 of the hub 11 which cooperate with the protuberances 38 to limit the extent of angular movability of the parts 11 and 32 relative to each other. The delay through the angle alpha is attributable to the fact that, when the hub 11 is caused to rotate in a first direction, its external profile 10 transmits torque to the protuberances 38 of the washer 32 and the latter is maintained in a first angular end position relative to the component 5. When the direction of angular movement of the component 5 relative to the hub 11 is thereupon changed, the washer 32 initially does not change its angular position relative to the component 5 while the extent of angular displacement of the component 5 and hub 11 relative to each other rises toward the angle corresponding to the combined play 39+40. Therefore, the frictional damping action of the washer 32 during the just described stage following a reversal in the direction of angular movement of the component 5 and hub 11 relative to each other is at least close to zero. However, once the clearance or play 39+40 is eliminated, i.e., when the transmission of torque between the protuberances 38 of the washer 32 and the outer profile 10 of the hub 11 is restarted, the washer 32 is caused to change its angular position relative to the component 5 to thus again generate a certain frictional damping action.

It is presently preferred to select the angle which amounts to the difference between the maximum angle 47 covered by the first damper 2 and the angle alpha in such a way that it is within the range of between about 10° and 35°. Such angle is shown in FIG. 6, as at 48, and is in the range of approximately 23°.

The frictional damping action which is generated by the washer 32 exists during that part of overall angular movability of the input member 5, 7 and output member (hub) 11 relative to each other when only the second damper 3 is called upon to transmit torque. However, the basic hysteresis H1 does not develop during the aforementioned part of overall or maximum angular movability of the input and output members relative to each other; such part of the overall angular displacement is represented by the portions c2 of the characteristic curve shown in FIG. 5. Thus, when only the second or main damper 3 is effective to transmit torque during angular displacement of the input and output members relative to each other, there develops in addition to the action of the damper 3 a frictional damping action or frictional hysteresis the magnitude of which is determined by the prestressing of the diaphragm spring 29. Such frictional damping action is generated in part as a result of friction between the ring 18 and the component 5, and in part as a result of friction between the ring 31 and the flange 8 or between the ring 31 and the disc 30.

As used in the claims, the term "second angle" (of at least 15°) which the second damper 3 permits for angular movement of the input member 5, 7 and the output member 11 relative to each other is intended to denote the sum of angular movements which the dampers 2 and 3 permit the input and output members to perform relative to each other while the vehicle is pulling a load as well as while the vehicle is coasting. As already explained above, the vehicle is in the process of pulling a load when the power train including the clutch disc 1 is in the process of transmitting torque from the prime mover (such as a combustion engine) to one or more wheels and/or other driven aggregates of the motor vehicle, and the vehicle is coasting when the transmission of torque takes place in the opposite direction, i.e., to the output element of the prime mover.

The maximum angular movability of the input and output elements 18, 20 of the first damper 2 is preferably between 20° and 45°, most preferably between 25° and 35°. On the other hand, the maximum relative movability of the input and output elements 5, 7 and 8 of the second damper 3 is preferably between 20° and 30°. However, the just mentioned ranges can be exceeded upwardly or downwardly under certain specific circumstances of use of the clutch disc 1 and its improved composite torsional vibration damper.

The aforementioned maximum torques which can be transmitted by the first damper 2 are valid primarily or particularly when the composite damper is put to use in a passenger motor car or in a small truck. Such maximum torques can or even must be increased when the improved composite torsional vibration damper is put to use in the power trains of larger or large trucks or analogous heavier or heavy duty vehicles.

It is also possible, or even necessary, to exceed the upper and/or the lower limit of the presently preferred torsional spring rate (between about 0.3 and 1.5 N-m/°) of the first damper under certain specific circumstances of use of a composite damper employing such first damper.

The first damper 2, and in many instances also the second damper 3, is preferably a single-stage damper within the entire or practically entire operating range of the respective damper.

An important advantage of the improved composite damper and of a device (such as the clutch disc 1) which utilizes the improved composite damper is that it is less likely to generate noise (or pronounced noise) than heretofore known composite dampers. Thus, when a motor vehicle having a power train embodying a conventional composite damper (including a first or idling damper and a second or main damper) is in the process of creeping, the composite damper is highly likely to generate undesirable noise and/or the tendency to cause undesirable vibrations. The term "creeping" is intended to denote that mode of operation of a motor vehicle when the latter is rolling with the friction clutch engaged and the variable-speed transmission shifted into a first or second gear ratio; at such time, the RPM of the engine matches or only slightly exceeds the idling RPM, i.e., the gas pedal is not depressed at all or is depressed only slightly. Noises which are generated under such circumstances of operation of a motor vehicle employing a standard composite damper are believed to be attributable to the fact that the first or idling damper is bypassed and the second or main damper is called upon to transmit torque. This results or can result in the generation of noise due to the relatively high torsional spring rate of the second damper.

The improved composite damper avoids such drawbacks of conventional composite dampers by ensuring that, when a vehicle employing the improved composite damper is in the process of creeping, the then developing fluctuations of torque are being taken up by the first damper 2, i.e., by a damper which permits relatively large angular movements between its input and output elements 18 and 20 and has a relatively flat spring gradient. The flat spring gradient (i.e., the relatively low rigidity or stiffness) of the first damper 2, combined with the ability of the input and output elements 18, 20 to turn through relatively large angles relative to each other, renders it possible to shift the resonance point or the resonance range in a direction toward lower rotational speeds. The first damper 2 is preferably, or can be, designed in such a way that the resonance point or the resonance range is below the idling RPM of the engine.

Another important advantage of the improved composite damper is that not only its first damper 2 but also its second damper 3 possesses a relatively high torque capacity or stop pin torque and (in comparison with conventional composite dampers) a relatively small slope or spring gradient.

As already described hereinbefore, the improved composite damper is designed in such a way that, starting from a neutral or starting position (namely a position when the clutch disc 1 is not called upon to transmit torque), the maximum possible angular displacement of the input and output members 5, 7 and 11 relative to each other in one direction is greater than in the opposite direction. It is presently preferred to select this feature of the improved composite damper in such a way that, if the composite damper is installed in a motor vehicle, the extent of angular displacement of the input and output members of the clutch disc 1 is greater when the vehicle is pulling a load than under the circumstances when the vehicle is coasting. The maximum possible angular displacement of the input and output members relative to each other can be selected to be within the range of between about 35° and about 70°, preferably between about 40° and about 60°. The ratio of maximum angular movability of the input and output members relative to each other in one direction (when the vehicle is pulling a load) to the maximum angular movability of such members in the opposite direction (when the vehicle is coasting) can be in the range of between about 1.2 and 2.

In accordance with a more specific presently preferred embodiment of the invention, the maximum angular displacement of the input and output elements 18, 20 of the first damper 2 when the vehicle is pulling a load can exceed the maximum permissible or possible angular displacement of such input and output elements relative to each other when the vehicle is coasting. It is presently preferred to select the ratio of the two maximum angular displacements of the input and output elements 18, 20 relative to each other in opposite directions to be between about 1.5 and 3. However, such ratio can be exceeded under certain circumstances (upwardly or downwardly) without departing from the spirit of the invention.

An important advantage of the feature that, in the illustrated clutch disc 1, the first damper 2 is installed between the flange 8 of the second damper 3 and one (5) of the disc-shaped components 5, 7 together constituting or forming part of the input member of the improved composite damper is that this renders it possible to assemble a highly compact composite damper (as seen in the direction of the common axis X of the input member 5, 7 and output member 11).

In accordance with a modification which is not shown in the drawings because it can be readily comprehended upon perusal of the illustrated clutch disc 1, the single input element or ring 18 of the first damper 2 can be replaced with two rings which are rotatably coupled to the flange 8 of the second damper 3 and flank a disc-shaped (e.g., washer-like) output element of the thus modified first damper. Reference may be had, for example, to published German patent application Ser. No. 34 42 705 which describes and shows a similar damper.

It is further possible to replace the illustrated first damper 2 (or the just described modified first damper) with a first damper wherein the ring 18 and the output element 20 of the illustrated damper 2 are replaced by rings which are or can be made of a suitable plastic material (such as the material of the ring 18) and one of which fully or at least partially surrounds the other as seen in the radial direction of such first damper. One of these rings constitutes the input element and the other ring constitutes the output element of the modified first damper. The energy storing elements (such as the coil springs 24 or equivalents thereof) are then installed in pairs of arcuate recesses one of which is provided in the internal surface of the radially outer ring and the other of which is provided in the peripheral surface of the radially inner ring. Such recesses are elongated in the circumferential direction of the two rings.

The feature that at least the energy storing elements 24 of the first damper 2 are coil springs which are precurved or bent at the spring manufacturing plant (or at least prior to actual insertion into the respective recesses 21 and windows 22) has been found to contribute significantly to the longer useful life of such energy storing elements and of the entire composite damper.

However, it is also possible to employ, for certain special purposes, a first damper with coil springs whose axes are straight or practically straight prior to insertion between the input and output elements 18, 20 of the first damper. The bending of such straight coil springs takes place during actual insertion into the respective recesses 21 and windows 22.

As already pointed out hereinbefore, the improved composite damper can be assembled in such a way that at least the coil springs 24 of the first damper 2 (i.e., of that damper which is first to compensate for fluctuations of torque when the input and output members of the composite damper begin to turn relative to each other) are inserted in at least slightly prestressed condition (namely before the input and output members are urged or actually caused to turn relative to each other under the action of forces other than those generated by the damper 2); however, in most instances the springs 24 can be installed without any initial stressing or in only negligibly stressed condition. Otherwise stated, at least the coil springs 24 of the first damper 2 will have a maximum length immediately upon completion of insertion of such springs into their respective recesses 21 and windows 22. The arrangement can be such that the length of the recesses 21 and/or windows 22 in the circumferential direction of the ring 18 can exceed the length of the respective springs 24 prior to axial stressing of such springs. If the recesses 21 as well as the windows 22 are longer than the unstressed coil springs 24, the input member 5, 7 and the output member 11 of the composite damper can turn relative to each other (from their starting or neutral positions) through an angle within which the coil springs 24 are not subjected to any axial compressive stresses.

The first damper 2 should comprise at least two energy storing elements. Irrespective of the exact number of such energy storing elements, they are preferably uniformly distributed in the circumferential direction of the input and/or output element of the first damper. FIG. 4 shows four equidistant coil springs 24 of identical size and shape; however, the number of such coil springs can be reduced to three or even two or increased to five or more.

The friction washer 32 constitutes a desirable and advantageous but optional feature of the first damper 2. Such washer contributes to more satisfactory operation of the first damper 2 as well as of the entire composite damper. The second damper 3 can also comprise or cooperate with one or more friction washers performing the function of the washer 32 or analogous functions.

The friction washer 32 of the first damper 2 can be said to constitute a so-called entrainment friction washer because, and as already fully described hereinbefore, it can perform a delayed or lagging frictional damping action. Reference may be had to the aforedescribed protuberances 38 and their cooepration with the external or outer profile 10 of the output member (hub) 11, i.e., there is some room for angular movement of the hub 11 and friction washer 32 relative to each other. Such delayed frictional damping action can be furnished even when the fluctuations of transmitted torque are being damped by the second or main damper 3.

The just described delayed frictional damping action can be resorted to with particular advantage in combination with the feature that the angle which corresponds to the difference between the relative angular displaceability of the input and output elements 18, 20 of the first damper 2 and the angular movability of the friction washer 32 relative to the adjacent part or parts is between about 10° and 35°. Such selection of the just mentioned difference ensures that the delayed frictional damping action invariably becomes effective prior to bypassing of the first damper 2. In addition, such selection of the aforementioned angle ensures that, in the case of minor or medium large vibrations of the input member 5, 7 and the output member 11 relative to each other, the delayed frictional damping action (i.e., the friction washer 32) remains ineffective.

That portion of the external profile 10 of the hub 11 which cooperates with the internal profile 9 of the flange 8 may but need not be identical with the adjacent portion of such external profile 10 which cooperates with the protuberance (s) 38 of the friction washer 32. Furthermore, it is equally possible to select an entirely different mode of coupling the washer 32 to the hub 11 with a desired amount of angular play.

In order to ensure that the friction washer 32 can properly center the component 5 of the input member of the composite damper relative to the hub 11, the component 5 must be designed in such a way that it has at least some freedom of radial movement relative to the hub 11 when not acted upon by the frustoconical surface 34 of the washer 32. The same applies for the component 7. The diaphragm spring 37 (or one or more equivalent resilient elements) ensures that the frustoconical surfaces 35, 34 of the radially inner portion 36 of the component 5 and of the friction washer 32 remain in uninterrupted frictional engagement with each other.

The improved composite damper is susceptible of numerous additional modifications without departing from the spirit of the present invention. For example, certain features of the actually described composite damper can be omitted and the improved composite damper can embody one or more features taken from the disclosures of the aforementioned granted patents and pending patent applications. Furthermore, certain individual constituents or certain combinations of two or more constituents forming part of the improved composite damper are believed to be worthy of patent protection per se. Still further, applicant believes himself to be entitled to patent protection for structures (such as friction clutches, power trains and the like) which embody the improved composite damper. Moreover, applicant reserves the right to present, during pendency of the present application, one or more claims reciting individual components, groups of components, apparatus and/or methods which are worthy of patent protection in addition to or in lieu of the protection sought with the appended claims.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A composite torsional vibration damper, comprising input and output members angularly movable with and relative to each other about a common axis; and first and second dampers installed in series between said input and output members, said first damper having a first rigidity and said second damper having a second rigidity greater than said first rigidity, said first damper comprising energy storing elements operative to permit an angular movement of said members relative to each other through a first angle of at least 20° and to transmit a maximum torque of between about 4 N-m and 20 N-m, said second damper being operative to permit an angular movement of said members relative to each other through a second angle of at least 15° and having a torsional spring rate in the range of between about 5 and 40 N-m/°.

2. The composite damper of claim 1, wherein said maximum torque is between about 6 N-m and 16 N-m.

3. The composite damper of claim 1, wherein said torsional spring rate is between about 10 and 25 N-m/°.

4. The composite damper of claim 1, wherein said first damper has a torsional spring rate of between about 0.3 and 1.5 N-m/°.

5. The composite damper of claim 1, wherein at least one of said members is angularly movable relative to the other of said members from a neutral position in a first direction through a first angle and in a second direction, counter to said first direction, through a different second angle.

6. The composite damper of claim 1, wherein said members and said first and second dampers are installed in a clutch disc of a friction clutch in a motor vehicle which is operative to pull a load or to coast, said members being movable relative to each other through a first angular distance when the vehicle is pulling a load and through a second angular distance, smaller than said first angular distance, when the vehicle is coasting.

7. The composite damper of claim 1, wherein said members and said first and second dampers are installed in a clutch disc of a friction clutch in a motor vehicle which is operative to pull a load or to coast, said members being movable relative to each other against the opposition of said first damper through a first angular distance when the vehicle is pulling a load and through a second angular distance, smaller than said first angular distance, when the vehicle is coasting.

8. The composite flywheel of claim 7, wherein said first angular distance is between about 1.5 and 3 times said second angular distance.

9. The composite flywheel of claim 1, wherein said first damper has a single-stage characteristic curve.

10. The composite damper of claim 1, wherein at least one of said first and second dampers has a single-stage characteristic curve.

11. The composite damper of claim 1, wherein said output member includes a hub having an internal profile non-rotatably engageable with a rotary driven element, said first damper further having an output element non-rotatably mounted on said output member and said second damper including an output element having an internal profile mounted on an external profile of said output member with limited freedom of angular movement between said output member and the output element of said second damper, said input member including two substantially disc-shaped components spaced apart from each other in the direction of said common axis and flanking the output element of said second damper.

12. The composite damper of claim 11, wherein said rotary driven element is the input shaft of a variable-speed transmission.

13. The composite damper of claim 11, wherein said first damper is disposed between the output element of said second damper and one of said components, as seen in the direction of said common axis.

14. The composite damper of claim 11, wherein said first damper further includes at least one substantially disc-shaped input element which is non-rotatably connected with the output element of said second damper, said at least one input element of said first damper having receptacles for said energy storing elements of said first damper.

15. The composite damper of claim 1, wherein said first damper further includes at least one substantially ring-shaped output element non-rotatably connected to said output member and disposed between a substantially disc-shaped input element of said first damper and a substantially flange-like element of said second damper, as seen in the direction of said axis.

16. The composite damper of claim 1, wherein said energy storing elements of said first damper define a first annulus having a first diameter and said second damper includes energy storing elements forming a second annulus having a second diameter larger than said first diameter.

17. The composite damper of claim 1, wherein said energy storing elements together form an annulus and are precurved in a circumferential direction of said members at least when said energy storing elements are not stressed as a result of angular movement of said members relative to each other.

18. The composite damper of claim 17, wherein said energy storing elements are arcuate coil springs, said annulus having a median radius and said coil springs having median radii of curvature at least approximating the median radius of said annulus at least in the unstressed condition of said coil springs.

19. The composite damper of claim 1, wherein at least said first damper comprises a friction control device.

20. The composite damper of claim 1, wherein at least said first damper comprises an entrainment friction washer.

21. The composite damper of claim 20, wherein the difference between a maximum value of said first angle and a free angle of said friction washer is between about 10° and 35°.

22. The composite damper of claim 1, wherein said energy storing elements of said first damper are constructed, installed and arranged to generate a frictional damping action which varies as a function of changes of said first angle.

23. The composite damper of claim 1, wherein said members are rotatable at a plurality of speeds and said energy storing elements of said first damper are constructed, installed and arranged to generate a frictional damping action which varies as a function of changes of the speed of said members.

24. The composite damper of claim 1, wherein said output member includes a hub having an external profile and said input member includes at least one substantially disc-shaped component, and further comprising an entrainment friction washer disposed between said profile and said at least one substantially disc-shaped component, as seen in the direction of said axis.

25. The composite damper of claim 24, wherein said washer is in friction generating contact with said at least one substantially disc-shaped component.

26. The composite damper of claim 24, wherein said friction washer has at least one protuberance mating with said profile of said hub and permitting limited angular movements of said washer and said hub relative to each other about said axis.

27. The composite damper of claim 26, wherein said profile includes teeth extending at least substantially in the direction of said axis and said at least one protuberance also extends at least substantially in the direction of said axis.

28. The composite damper of claim 24, wherein said friction washer has a substantially frustoconical surface which centers said at least one substantially disc-shaped component relative to said hub.

29. The composite damper of claim 24, further comprising means for biasing said friction washer against said at least one substantially disc-shaped component.

30. The composite damper of claim 29, wherein said means for biasing comprises a diaphragm spring which reacts against an input element of said first damper and bears upon said friction washer.

31. A composite torsional vibration damper, comprising input and output members angularly movable with and relative to each other about a common axis; and first and second dampers installed in series between said input and output members, said first damper having a first rigidity and said second damper having a second rigidity greater than said first rigidity, said first damper having a torsional spring rate of at least 0.3 N-m/° and comprising energy storing elements operative to permit an angular movement of said members relative to each other through a first angle and to transmit a maximum torque of between about 4 N-m and 20 N-m, said second damper being operative to permit an angular movement of said members relative to each other through a second angle of at least 15° and having a torsional spring rate in the range of between about 5 and 40 N-m/°.

32. The composite damper of claim 31, wherein said first angle is at least 20°.

33. The composite damper of claim 31, wherein said first damper has a torsional spring rate of at most 1.5 N-m/°.

34. The composite damper of claim 31, wherein said maximum torque is between about 6 N-m and 16 N-m.

35. The composite damper of claim 31, wherein said torsional spring rate is between about 10 and 25 N-m/°.

36. The composite damper of claim 31, wherein said energy storing elements together form an annulus and are precurved in a circumferential direction of said members at least when said energy storing elements are not stressed as a result of angular movement of said members relative to each other.

37. The composite damper of claim 36, wherein said energy storing elements are arcuate coil springs, said annulus having a median radius and said coil springs having median radii of curvature at least approximating the median radius of said annulus at least in the unstressed condition of said coil springs.

38. The composite damper of claim 31, wherein said energy storing elements of said first damper are constructed, installed and arranged to generate a frictional damping action which varies as a function of changes of said first angle.

39. The composite damper of claim 31, wherein said members are rotatable at a plurality of speeds and said energy storing elements of said first damper are constructed, installed and arranged to generate a frictional damping action which varies as a function of changes of the speed of said members.

40. A composite torsional vibration damper, comprising input and output members angularly movable with and relative to each other about a common axis; and first and second dampers installed in series between said input and output members, said first damper having a first rigidity and said second damper having a second rigidity greater than said first rigidity, said first damper comprising energy storing elements operative to permit an angular movement of said members relative to each other through a first angle and to transmit a maximum torque of between about 4 N-m and 20 N-m, said energy storing elements being precurved in a circumferential direction of said members at least when said energy storing elements are not stressed as a result of angular movement of said members relative to each other, said second damper being operative to permit an angular movement of said members relative to each other through a second angle of at least 15° and having a torsional spring rate in the range of between about 5 and 40 N-m/°.

41. The composite damper of claim 40, wherein said first angle is at least 20°.

42. The composite damper of claim 40, wherein said first damper has a torsional spring rate of at least 0.3 N-m/°.

43. The composite damper of claim 40, wherein said first damper has a torsional spring rate of at most 1.5 N-m/°.

44. The composite damper of claim 40, wherein said maximum torque is between about 6 N-m and 16 N-m.

45. The composite damper of claim 40, wherein said torsional spring rate is between about 10 and 25 N-m/°.

46. The composite damper of claim 40, wherein said energy storing elements are arcuate coil springs and together form an annulus having a median radius, said coil springs having median radii of curvature at least approximating the median radius of said annulus at least in the unstressed condition of said coil springs.

47. The composite damper of claim 40, wherein said energy storing elements of said first damper are constructed, installed and arranged to generate a frictional damping action which varies as a function of changes of said first angle.

48. The composite damper of claim 40, wherein said members are rotatable at a plurality of speeds and said energy storing elements of said first damper are constructed, installed and arranged to generate a frictional damping action which varies as a function of changes of the speed of said members.

49. A composite torsional vibration damper, comprising input and output members angularly movable with and relative to each other about a common axis; and first and second dampers installed in series between said input and output members, said first damper having a first rigidity and said second damper having a second rigidity greater than said first rigidity, said first damper comprising energy storing elements operative to permit an angular movement of said members relative to each other through a first angle and to transmit a maximum torque of at most 20 N-m, said energy storing elements being constructed, installed and arranged to generate a frictional damping action which varies as a function of changes of said first angle, said second damper being operative to permit an angular movement of said members relative to each other through a second angle of at least 15° and having a torsional spring rate in the range of between about 5 and 40 N-m/°.

50. The composite damper of claim 49, wherein said first angle is at least 20°.

51. The composite damper of claim 49, wherein said maximum torque is between about 6 N-m and 16 N-m.

52. The composite damper of claim 49, wherein said first damper has a torsional spring rate of at least 0.3 N-m/°.

53. The composite damper of claim 49, wherein said first damper has a torsional spring rate of at most 1.5 N-m/°.

54. The composite damper of claim 49, wherein said torsional spring rate is between about 10 and 25 N-m/°.

55. The composite damper of claim 49, wherein said energy storing elements together form an annulus and are precurved in a circumferential direction of said members at least when said energy storing elements are not stressed as a result of angular movement of said members relative to each other.

56. The composite damper of claim 55, wherein said energy storing elements are arcuate coil springs, said annulus having a median radius and said coil springs having median radii of curvature at least approximating the median radius of said annulus at least in the unstressed condition of said coil springs.

57. The composite damper of claim 49, wherein said members are rotatable at a plurality of speeds and said energy storing elements of said first damper are constructed, installed and arranged to generate a frictional damping action which varies as a function of changes of the speed of said members.

58. The composite damper of claim 49, wherein said input and output members are angularly movable relative to each other in a clockwise and in a counterclockwise direction, said energy storing elements being operative to transmit a maximum torque of at least 4 N-m during relative angular movement of said members in at least one of said directions.

* * * * *